United States Patent [19]

Murakami

[11] Patent Number: 5,517,064
[45] Date of Patent: May 14, 1996

[54] PROTECTIVE DEVICE FOR LIGHTING SYSTEM USED IN MOTOR VEHICLE

[75] Inventor: Takashi Murakami, Furukawa, Japan

[73] Assignee: Alps Electric Co., Ltd., Tokyo, Japan

[21] Appl. No.: 274,934

[22] Filed: Jul. 14, 1994

[30] Foreign Application Priority Data

Jul. 15, 1993 [JP] Japan ..................... 5-197897

[51] Int. Cl.$^6$ ................. H02J 1/00; B60Q 1/00
[52] U.S. Cl. ............... 307/10.1; 307/10.8; 307/106; 315/76; 315/77; 315/82; 340/428; 340/458
[58] Field of Search ................. 307/9.1, 10.1, 307/10.6, 10.7, 10.8, 106; 327/100; 315/76, 77, 82, 312, 313, 314, 315, 322, 130; 323/284, 288; 340/428, 458, 468, 469, 636, 641, 660, 661, 662, 664

[56] References Cited

U.S. PATENT DOCUMENTS

| | | | |
|---|---|---|---|
| 3,577,064 | 5/1971 | Nercessian | 340/662 |
| 3,901,247 | 8/1975 | Walmsley | 340/636 |
| 4,021,793 | 5/1977 | Hill et al. | 340/660 |
| 4,321,509 | 3/1982 | Miyaji et al. | 315/291 |
| 4,634,903 | 1/1987 | Montorfano | 327/432 |
| 4,841,198 | 6/1989 | Wilhelm | 315/82 |
| 4,935,641 | 6/1990 | Wilhelm | 307/10.8 |
| 5,001,398 | 3/1991 | Dynn | 307/10.8 |
| 5,057,814 | 10/1991 | Onan et al. | 307/10.8 |
| 5,247,240 | 9/1993 | Kayser et al. | 323/288 |
| 5,264,783 | 11/1993 | Vig et al. | 323/368 |
| 5,440,208 | 8/1995 | Uskali et al. | 315/314 |
| 5,449,973 | 9/1995 | Yamashita et al. | 315/82 |

Primary Examiner—William M. Shoop, Jr.
Assistant Examiner—Peter Ganjoo
Attorney, Agent, or Firm—Guy W. Shoup; Patrick T. Bever

[57] ABSTRACT

A protective device for a lighting system to be used for a motor vehicle constituting a power supply and a light source energized with the power from the power supply. The power to be supplied to the light source is controlled by a driver. The driver is input with either a signal from a PWM pulse generator or a signal from a fixed duty pulse generator for the control of power to be supplied to the light source, and the changeover of these pulse generators is operated based on a detection signal from a voltage detector which monitors the voltage of the power supply.

9 Claims, 5 Drawing Sheets

PROTECTIVE DEVICE FOR LIGHTING SYSTEM USED IN MOTOR VEHICLE

BACKGROUND OF THE INVENTION

1. Field of the Invention

The present invention relates to a protective circuit for a lighting system used in a motor vehicle, in particular, it relates to an overvoltage protective circuit for a lighting system using a lamp.

2. Description of the Related Art

A conventional protective circuit for a lighting system used in a motor vehicle is shown in FIG. 4.

A protective circuit shown in the figure, usually, uses a 12 V battery and is composed of a power supply 1, a lamp (light source) 2 for lighting a meter panel, etc. in a motor vehicle, which is energized by the power from the power supply 1, and a driver 3 for driving the light source 2. A MOSFET is used in the driver. The driver controls the power to be supplied to the light source 2 by the power supply 1 according to a control signal (described below).

A voltage detector 4 monitors the voltage of the power supply 1 and when the voltage exceeds 12 V, which is a normal operating voltage level, a signal generated by the occurrence of an overvoltage is supplied to a voltage controller 5. The voltage controller 5 comprises a pulse-width modulated (PWM) pulse generator and lowers the duty ratio of a pulse signal output from a voltage setter 6 in response to a signal received from the voltage detector 4.

The voltage setter 6 is composed of variable resistors and sets the duty ratio of the output of the PWM pulse generator, and when an abnormal voltage is generated, it lowers the duty ratio of the output of the PWM pulse generator according to a signal from the voltage controller 5.

A comparing circuit 7 is a logic circuit composed of a comparator and it receives the output of the voltage setter 6 at an inverting terminal and receives the output of a chopping wave generator 8 at a non-inverting terminal, and compares the levels of both terminals. When the level of the non-inverting terminal is higher than the level of the inverting terminal, the comparing circuit 7 outputs a control signal to the driver 3.

A chopping wave generator 8 is composed of a square wave generator and an integrating circuit. It generates chopping waves utilizing the inclination of a build-up waveform of the integrating circuit in inputting a square wave signal generated by a square wave generator to the integrating circuit.

The operation of the above-mentioned protective circuit will be explained using FIG. 5 in the following.

When the voltage of the power supply 1 is lower than a predetermined voltage, 12 V, the output level of the voltage setter 6 is set to be lower than the peak value, 12 V, of the output level of the chopping wave generator, so that the output waveform of the comparator 7 is a square waveform of a constant width.

When the voltage of the power supply 1 exceeds 12 V, a signal is transmitted to the voltage controller 5 from the voltage detector 4. The peak value of the output waveform of the chopping wave generator becomes also higher than 12 V following the voltage surge of the power supply 1, because the voltage from the power supply 1 is also applied to the chopping wave generator. The voltage controller 5 outputs a control signal to the voltage setter 6 to raise the set value. The set value of the voltage setter 6 is raised based on the control signal, so that, as shown in FIG. 5, the output waveform from the comparator 7 becomes narrower (low duty ratio) as the voltage becomes higher; thereby, the output is controlled to have a constant current flow quantity.

In the case of a conventional protective circuit, however, as a countermeasure for a rush current which occurs at the ON operation of the power supply 1 to energize a lamp, the duty ratio of the PWM circuit is controlled. In this case, there has been a problem as shown below: after an ON operation of the power supply 1, when an overcurrent occurs influenced by the voltage surge, etc. of the power supply 1, since there is no protective function for the overcurrent from the power supply 1, a sufficiently protective function for reducing the overvoltage which is applied to the light source 2 cannot be executed; therefore, when such a overvoltage occurs repeatedly, the lives of parts, especially the life of a lamp, in a lighting system can be shortened.

For the solution of such a problem, a special and high priced IC called an illumination control IC for a motor vehicle, a PWM signal generator IC, has to be used, which raises the cost of the device.

SUMMARY OF THE INVENTION

The present invention was invented in consideration of such circumstances in the conventional art, and the object of the invention is to offer a protective circuit for a lighting system used in a motor vehicle which is able to keep the life of a lamp long and the manufacturing cost of the circuit low.

In order to achieve the above-mentioned object, a protective device according to the present invention comprises: a power supply; a light source to be energized by the power supplied from the power supply; a driver for controlling the power to be supplied to the light source; a pulse-width modulated (PWM) control circuit for supplying a PWM signal to the driver; a fixed duty ratio pulse generator; a voltage detector for detecting the voltage of the power supply; and a switching circuit which changes over the PWM signal generator and the fixed duty ratio pulse generator based on a detection signal from the voltage detector.

The above-mentioned means are operated as described below.

In a protective device according to the present invention, when the power supply voltage is lower than a predetermined value, the voltage detector does not work and the switching circuit is positioned at a normal position, and the power supply voltage, as it is, is applied to the light source.

When the power supply voltage is raised higher than the predetermined value, the voltage to be applied to the light source is detected to be higher than a predetermined value by the voltage detector, and the switch is changed over by the switching circuit. A fixed duty ratio signal output by the fixed duty ratio pulse generator is input to the driver with the changeover of the switch, and the voltage to be applied to the light source is controlled to be lower than a predetermined value.

Therefore, the light source becomes free from an overvoltage and the life of a lamp can be kept long.

DETAILED DESCRIPTION OF THE PREFERRED EMBODIMENT

An embodiment according to the present invention will be explained based on the drawings in the following.

Figure 1:
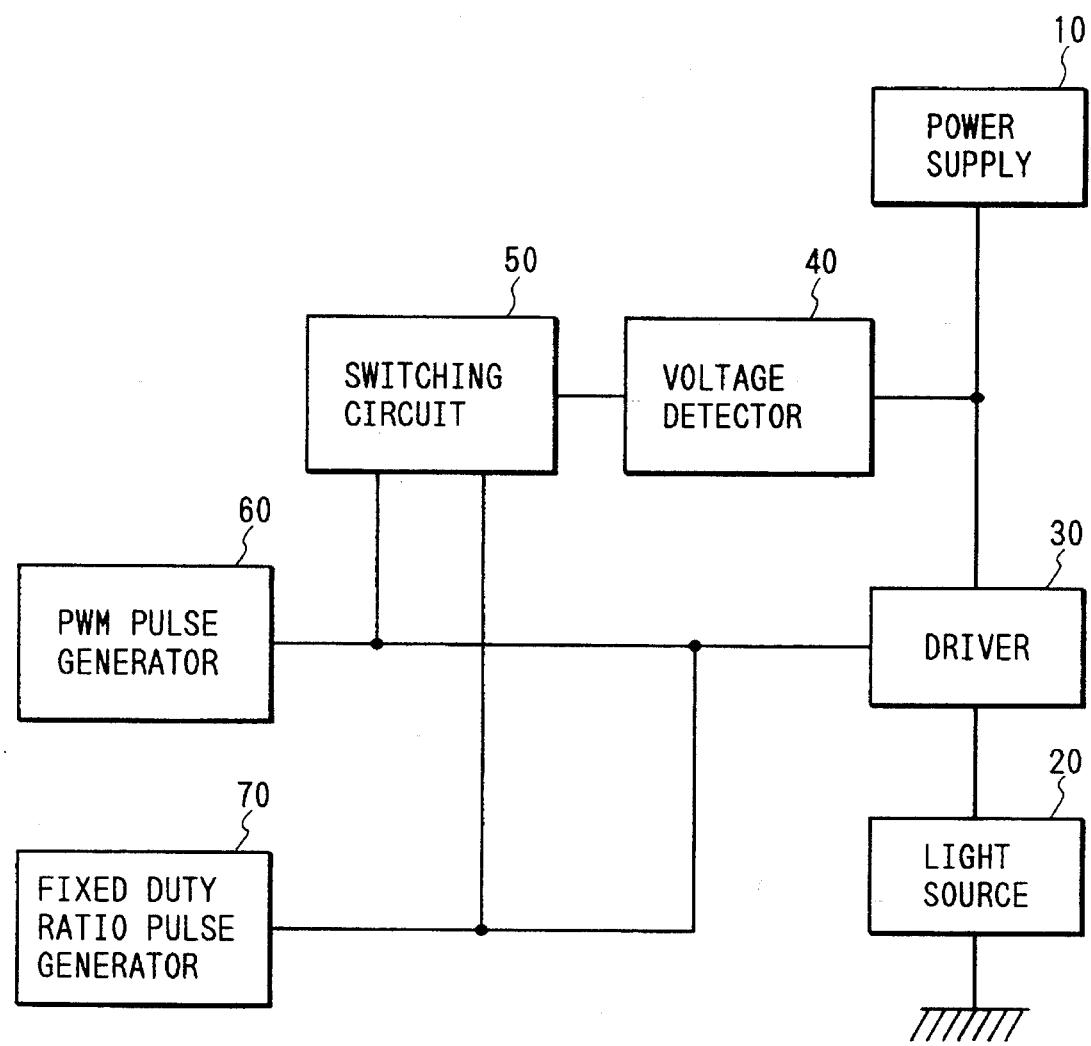
FIG. 1 is a block diagram showing an embodiment of a protective circuit for a lighting system used in a motor vehicle according to the present invention.
Figure 2:
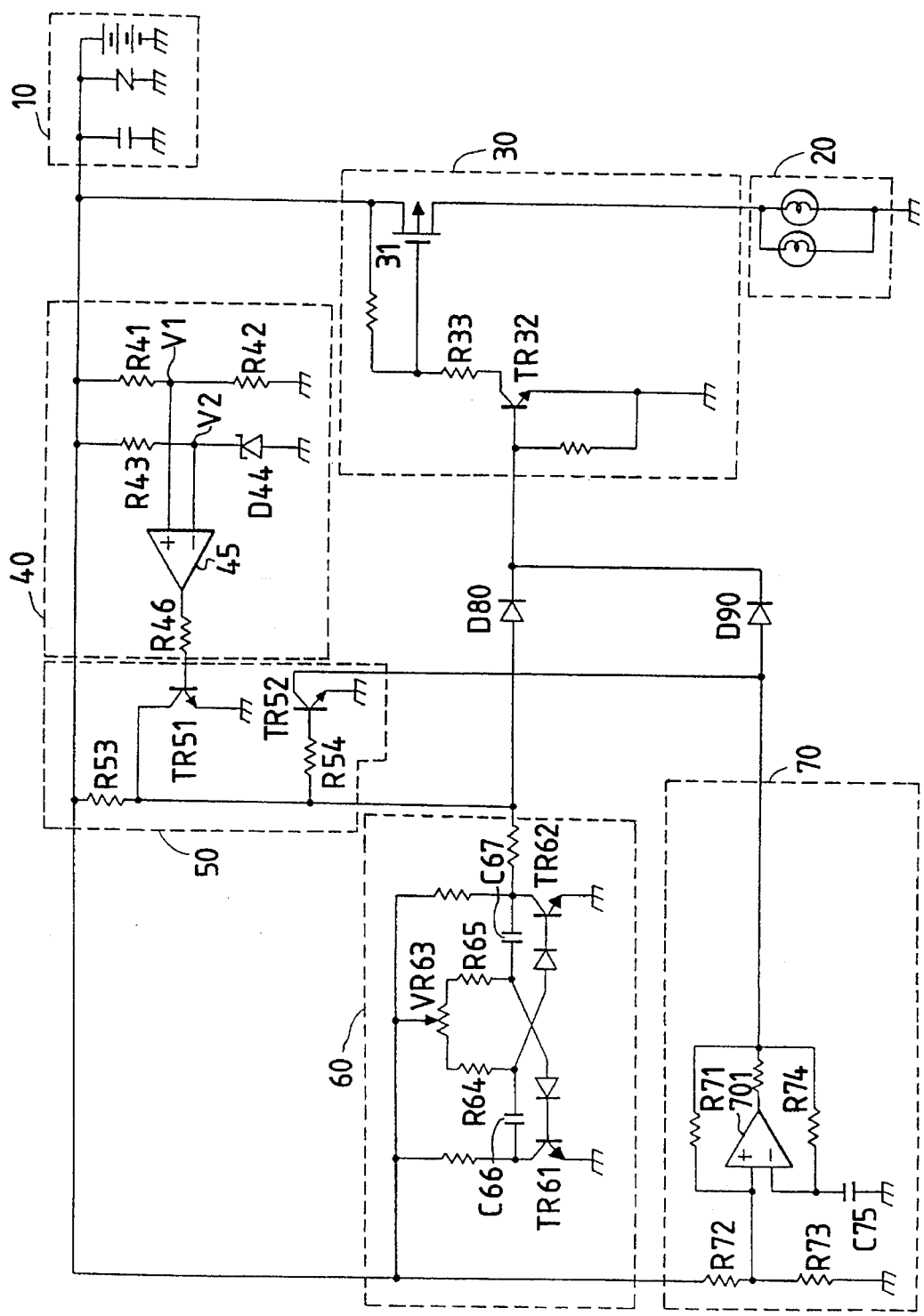
FIG. 2 is a circuit diagram showing the concrete constitution of the embodiment shown in FIG. 1.
Figure 3:
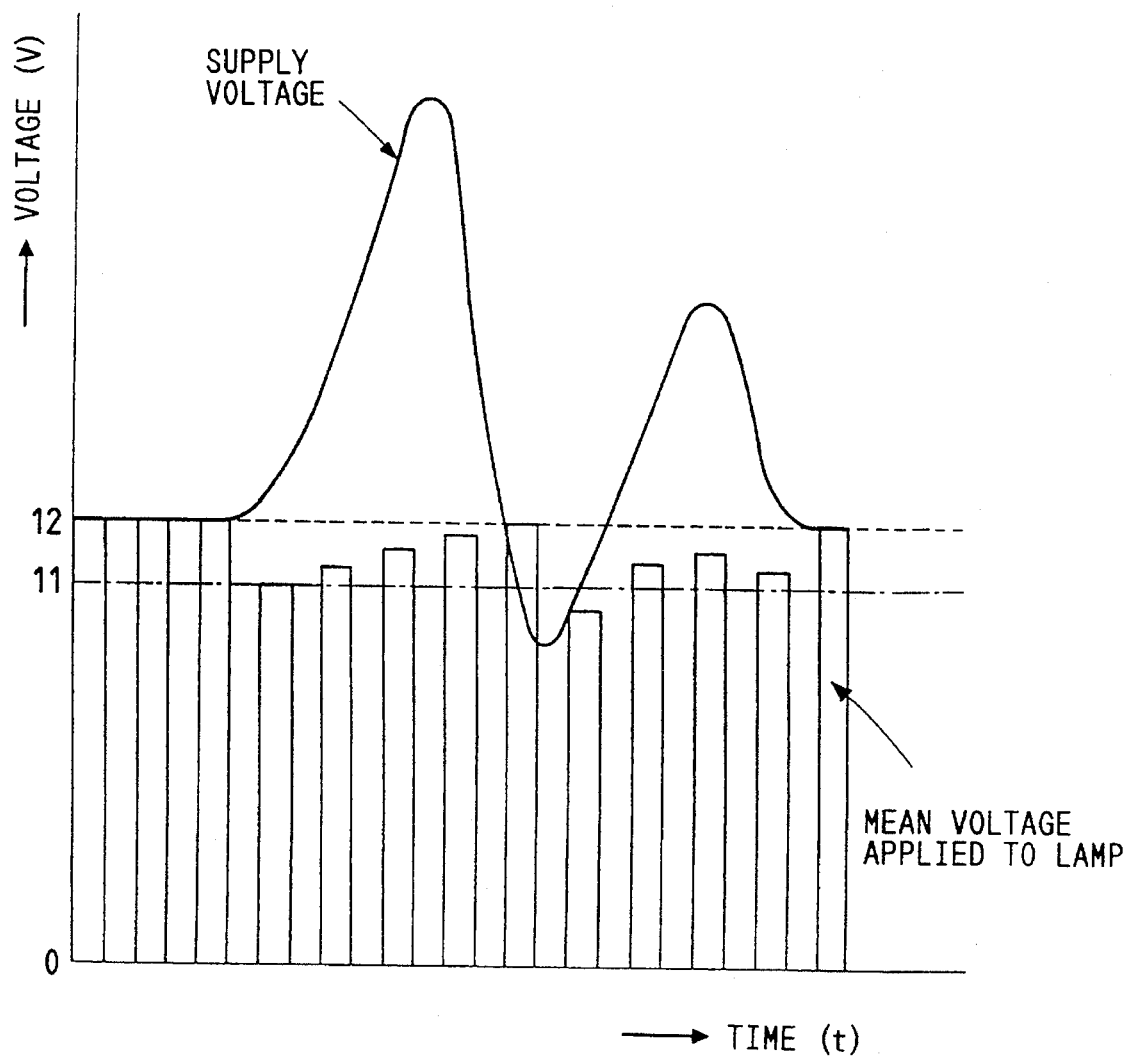
FIG. 3 shows an operational waveform diagram of the embodiment shown in FIG. 1. The axis of abscissas expresses time and the axis of ordinates expresses voltage in volt, and the mean voltage applied to a lamp and the power supply voltage are shown in the diagram.
Figure 4:
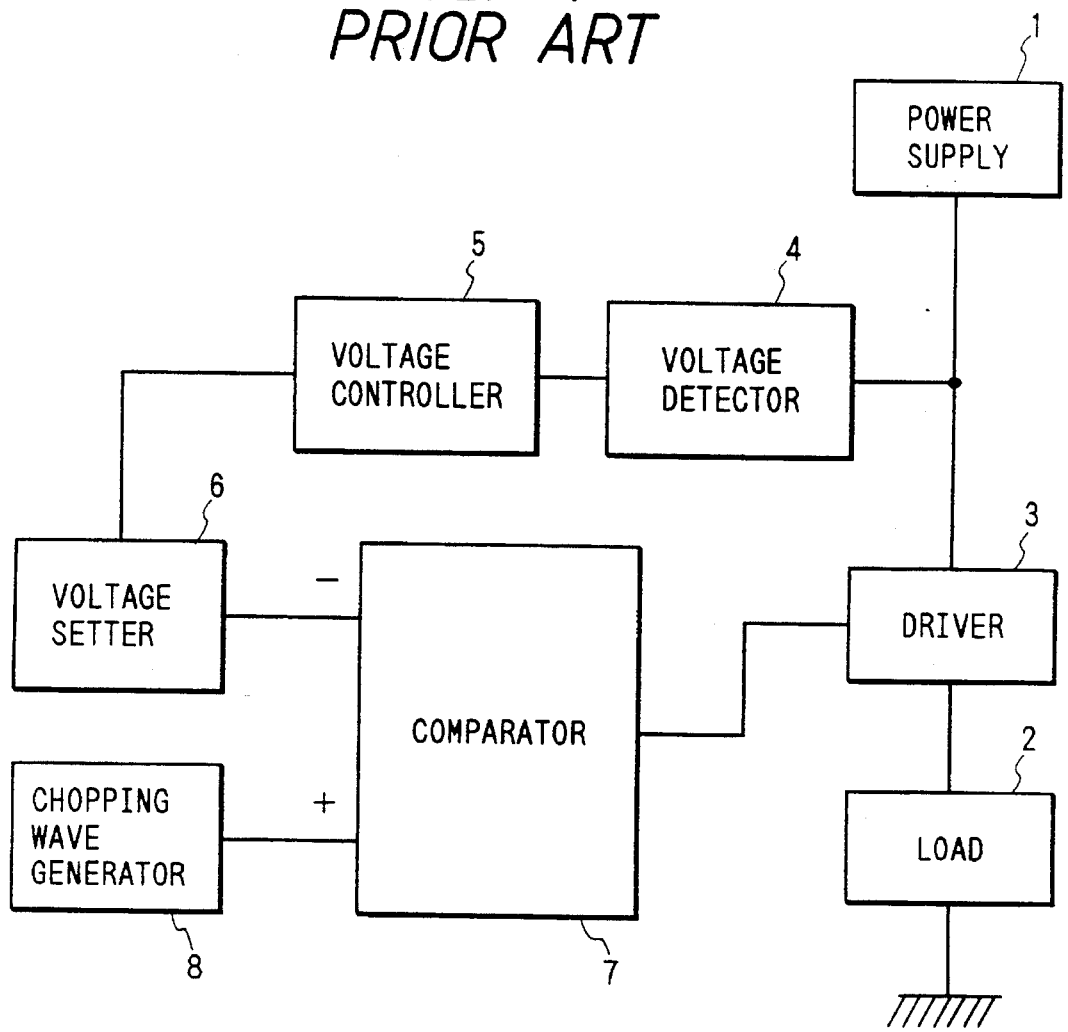
FIG. 4 is a block diagram showing an example of a conventional protective circuit for a lighting system used in a motor vehicle.
Figure 5:
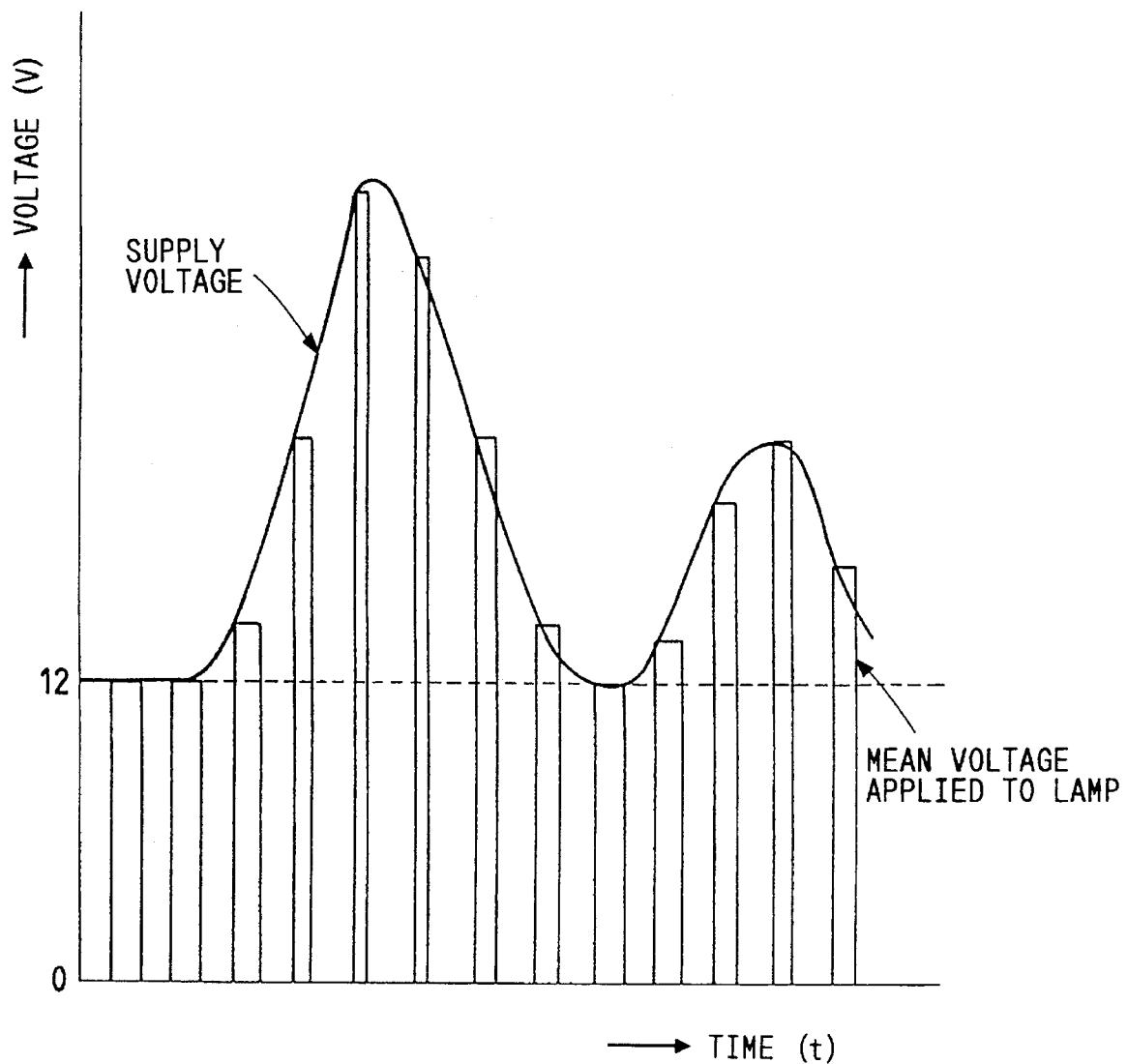
FIG. 5 shows an operational waveform diagram of the conventional example shown in FIG. 4. The axis of abscissas expresses time and the axis of ordinates expresses voltage in volt, and the mean voltage applied to a lamp and the power supply voltage are shown in the figure.

FIG. 1 is a block diagram of an overvoltage protective circuit in an embodiment according to the present invention, FIG. 2 is a wiring diagram of the overvoltage protective circuit shown in FIG. 1, and FIG. 3 is a waveform diagram of the overvoltage protective circuit.

Usually the protective circuit uses a 12 V battery and it comprises a power supply 10, a lamp 20 for lighting a meter panel etc. in a motor vehicle which is one of the light sources which are energized by the power supplied from the power supply 10, and a driver 30 for controlling the energizing of the lamp 20. A MOSFET is used in the driver 30. The driver 30 controls the power to be supplied to the lamp 20 from the power supply 10 according to a control signal to be explained later.

The power supply 10 which supplies power to the lamp 20 usually uses a 12 V battery as shown in these figures; however, the voltage can be changed by various kinds of loads or various kinds of conditions and sometimes it can reach 300 V by the occurrence of a surge current, etc.

The driver 30 for driving the light source 20 controls the current which flows from the power supply 10 to the lamp 20 with the signals from a PWM control circuit 60 or a fixed duty ratio pulse circuit 70, which will be explained later. The driver 30 comprises a MOSFET 31, a transistor 32 to be used as an input buffer for the MOSFET 31 and a protective resistor 33 connected between the MOSFET 31 and the transistor 32.

A voltage detector 40 connected to the power supply 10 is a circuit which detects the voltage of the power supply 10, and it comprises resistors, R41, R42 and R43 for dividing a voltage, a Zener diode ZD44 and a comparator 45.

The voltage detector 40 inputs a voltage V1, a voltage obtained by dividing the voltage of the power supply 10 with the resistors, R41 and R42, and a voltage V2, a voltage generated by a reference voltage generator ZD44 and compares both voltages with the comparator 45 which is incorporated in it, and when the V1 is higher than V2, an output signal is generated in the comparator 45, and the signal is supplied to a switching circuit 50 through a resistor 46.

The switching circuit 50 connected to the voltage detector 40 comprises: transistors, TR51 and TR52 which are connected in parallel to the power supply 10; a resistor R53 connected between the transistors, TR51 and TR52, and to the power supply 10; and a resistor R54 connected to the base of the TR52. When there is an output signal from the voltage detector 40, the TR51 is turned ON and when there is no output signal, the TR52 is in an on state.

The PWM control circuit 60 is composed of an astable multivibrator in which transistors, TR61 and TR62, repeat ON and OFF alternately, and it generates a square wave whose frequency is decided by a variable resistor VR63, resistors, R64 and R65, and capacitors, C66 and C67, and the output is transmitted to the output side.

A diode D80 is connected between the output side and the driver 30.

A fixed duty ratio pulse generator 70 is an oscillator utilizing a comparator 701, and resistors, R72 and R73, are voltage dividing resistors to decide a threshold voltage. A resistor R74 and a capacitor C75 constitute an integrating circuit to decide the oscillation frequency of the generator 70. In the case of the fixed duty ratio pulse generator 70, when the power supply 10 is turned ON, the input level of the non-inverting terminal of the comparator 701 is higher than that of the inverting terminal, so that the output of the comparator becomes high. Thereby, the capacitor C75 is charged up gradually and the potential level increases and, after a period of time, the level exceeds the input level of the non-inverting terminal. Then, the output of the comparator 701 is switched to low, and the charge accumulated in the capacitor C75 is discharged through a resistor 74. Then, the potential of the minus terminal of the comparator 701 becomes lower again than the input level of the plus terminal, and the output of the comparator 701 becomes high again and the charging of the capacitor C75 is resumed. After that, the same operation is repeated, and a fixed duty ratio pulse signal of the same frequency is output.

A diode D90 is connected between the output side of the fixed duty ratio pulse generator and the input side of the driver 30.

A control signal output from the above-mentioned PWM pulse generator 60 or fixed duty ratio pulse generator 70 is input to the base of the TR32 through the diode, D80 or D90, respectively, and a signal from the collector of the TR32 is input to the gate of the MOSFET 31 through a protective resistor R33; thereby, the MOSFET 31 controls the current which flows through the lamp 20 according to the control signal.

Next, the operation of the overvoltage protective circuit will be explained based on FIG. 2 and FIG. 3.

(1) The case where the supply voltage is lower than a predetermined value

In this case, a plus terminal voltage level V1 of the comparator 45 incorporated in the voltage detector 40 which monitors the voltage of the power supply 10 is lower than a predetermined level V2, so that the output of the comparator 45 becomes low. Thereby, the TR51 of the switching circuit 50 is in an OFF state. Therefore, a current flows through the base of the TR52 through R53 and R54 from the power supply 10 and the TR52 is in an ON state. Thereby, the output of the fixed duty ratio pulse generator 70 flows to ground through the collector of the TR52, so that it does not flow to the side of the driver 30. Therefore, the signal of the PWM control circuit 60 is transmitted to the driver 30 through the diode D80, and the drive 30 is operated as it is.

The waveform of a voltage applied to the lamp 20 is square shaped, but the voltage value is the same to that of the power supply 10.

(2) The case where the power supply voltage is higher than a predetermined value In this case, the plus terminal voltage level V1 of the comparator 45 incorporated in the voltage detector 40 is higher than the reference voltage level V2, so that the output of the comparator 45 becomes high. Thereby, the TR51 of the switching circuit 50, which is normally in an OFF state, is turned ON, and the current from the power supply 10 is connected to ground through the TR51 and through the R53, so that the current does not flow to the TR52, which is normally in an ON state, thereby turning TR52 OFF. The output of the PWM control circuit 60 is also connected to ground through the TR51, so that the output is not transmitted to the driver 30. After that, when the TR52 is turned OFF, the output signal of the fixed duty ratio pulse generator 70 is transmitted to the driver 30 through the diode D90.

The duty ratio of the output of the fixed duty ratio pulse generator 70 is 50%, and the control signal of 50% duty ratio controls the current input to the gate of the MOSFET 31. The operation level in this case differs from a normal state, and the voltage to be applied to a lamp 20 is 11 V constant.

Therefore, as shown in FIG. 3, when the voltage of the power supply 10 is 12 V, the mean voltage applied to the lamp 20 is kept to be 12 V, and when the voltage of the power supply 10 is raised higher than 12 V, the applied voltage to the lamp 20 is lowered to 11 V by the operation of the fixed duty ratio pulse generator 70.

Owing to the operation as mentioned in the above, the voltage to be applied to the lamp 20 is limited not to be higher than 12 V, which contributes to a longer life of a lamp. The circuit can be simply constituted using a general IC such as a comparator, etc.

What is claimed is:

1. A protective device for a lighting system to be used in a motor vehicle comprising:

a power supply;

a light source energized by an amount of power supplied from said power supply;

a driver for controlling the amount of power supplied to said light source, the driver being connected between said power supply and said light source;

a pulse-width modulated (PWM) control circuit for generating a PWM signal;

a fixed duty ratio pulse generator for supplying a fixed duty ratio oscillation signal;

a voltage detector for detecting a voltage level of said power supply and for generating a detection signal in response to said detected voltage level, said voltage detector being connected to said power supply;

a switching circuit for connecting one of said PWM signal from said PWM pulse generator and said fixed duty ratio oscillation signal from said fixed duty ratio pulse generator to said driver in response to said detection signal from said voltage detector.

2. A protective device for a lighting system to be used in a motor vehicle according to claim 1, wherein:

when the voltage level of said power supply is lower than or equal to a predetermined voltage level, said PWM signal is output from said PWM pulse generator to said driver; and when the voltage level of said power supply exceeds the predetermined voltage level, said fixed duty ratio oscillation signal is output from said fixed duty ratio pulse generator to said driver.

3. A protective device for a lighting system to be used in a motor vehicle according to claim 1, wherein:

said PWM pulse generator includes an astable multivibrator which constantly outputs a signal;

said fixed duty ratio pulse generator includes a comparator which outputs a signal of a fixed oscillation frequency; and two transistors which form said switching circuit are changed over alternately, and when the power supply voltage level exceeds a predetermined voltage level, a signal from said astable multivibrator is prevented from being transmitted to said driver, and a fixed voltage which is different from the power supply voltage is applied to said light source.

4. A protective device for controlling an applied voltage level transmitted to a light source from a power supply in a motor vehicle, the power supply having a power supply voltage level, the protective device comprising:

a driver connected between the power supply and the light source, the driver having a control terminal, the driver controlling the applied voltage level in response to a control signal received at the control terminal;

a pulse-width modulated (PWM) control circuit for generating a PWM control signal, the PWM control circuit having a first output terminal;

a fixed duty ratio pulse generator for generating a fixed duty ratio control signal, the fixed duty ratio pulse generator having a second output terminal; and a switching circuit for connecting the PWM control signal to the control terminal of the driver when the power supply voltage level is below a predetermined voltage level, and for connecting the fixed duty ratio control signal to the control terminal of the driver when the power supply voltage level is above the predetermined voltage level;

wherein the applied voltage level is equal to or less than the predetermined voltage level.

5. A protective device according to claim 4 further comprising a voltage detector for detecting the power supply voltage level and for generating a voltage detection signal which is at a first voltage level when the power supply voltage level is above the predetermined voltage level, and the voltage detection signal is at a second voltage level when the power supply voltage level is equal to or less than the predetermined voltage level.

6. A protective device according to claim 5 wherein the voltage detector comprises a comparator having a first input terminal connected to the power supply through a voltage divider and a second input terminal connected to a reference voltage, the comparator also having a voltage detector output terminal.

7. A protective device according to claim 6 wherein the switching circuit comprises:

a first transistor having a base connected to the voltage detector output terminal, a collector connected to the power supply and to the first output terminal of the PWM control circuit, and an emitter connected to ground;

a second transistor having a base connected to the power supply, a collector connected to the second output terminal of the fixed duty ratio pulse generator, and an emitter connected to ground;

wherein when the voltage detection signal is at the first level, the first transistor is turned on and the fixed duty ratio control signal is transmitted to ground, and the second transistor is turned off and the PWM control signal is applied to the control terminal of the driver; and wherein when the voltage detection signal is at the second level, the second transistor is turned on and the PWM control signal is transmitted to ground, and the first transistor is turned off and the fixed duty ratio control signal is applied to the control terminal of the driver.

8. A protective device according to claim 7, wherein:

said PWM pulse generator includes an astable multivibrator which constantly outputs the PWM control signal and is connected to the control terminal of the driver through a first diode; and said fixed duty ratio pulse generator includes a comparator which outputs the fixed duty ratio control signal having a fixed oscillation frequency and is connected to the control terminal of the driver through a second diode.

9. A protective device according to claim 7, wherein the driver comprises:

a bipolar transistor having a base connected to the control terminal, a collector connected to the power supply and an emitter connected to ground; and a field effect transistor having a gate connected to the collector of the bipolar transistor, a first terminal connected to the power supply and a second collector connected to the light source.

* * * * *